United States Patent [19]

Mori et al.

[11] Patent Number: 4,465,228
[45] Date of Patent: Aug. 14, 1984

[54] COOKER WITH HEATING CONTROL SYSTEM

[75] Inventors: Keiichi Mori, Izumiotsu; Shojiro Inoue, Kitakatsuragi; Manabu Takada, Yamatokoriyama, all of Japan

[73] Assignee: Matsushita Electric Industrial Co., Ltd., Kadoma, Japan

[21] Appl. No.: 411,954

[22] Filed: Aug. 26, 1982

[30] Foreign Application Priority Data

| Sep. 9, 1981 [JP] | Japan | 56-142688 |
| Sep. 10, 1981 [JP] | Japan | 56-143684 |
| Oct. 9, 1981 [JP] | Japan | 56-161644 |
| Jan. 14, 1982 [JP] | Japan | 57-4068 |

[51] Int. Cl.³ ............................ A47J 27/00; F23N 1/08
[52] U.S. Cl. .................................. 236/20 A; 126/374; 122/448 R; 374/27
[58] Field of Search ............... 236/20 A; 122/448 R; 126/374, 351, 39 G; 364/557; 374/27, 25

[56] References Cited

U.S. PATENT DOCUMENTS

| 3,667,280 | 6/1972 | Simpson | 374/25 |
| 4,070,670 | 1/1978 | Chen | 236/20 A |
| 4,383,770 | 5/1983 | Boschung et al. | 374/25 |

*Primary Examiner*—William E. Wayner
*Attorney, Agent, or Firm*—Cushman, Darby & Cushman

[57] ABSTRACT

A highly automationed cooking apparatus especially suitable for stew cooking or the like liable to boiling over. Temperature of outer bottom face of a pan is measured by a sensor and temperature gradients are sampling-measured at a sampling time pitch. Boiling point of food material is detected by finding a decrease of the temperature gradient, and thereafter the heating is lowered to avoid boiling over to a suitable value which is given by processing the temperature gradients.

21 Claims, 12 Drawing Figures

COOKER WITH HEATING CONTROL SYSTEM

BACKGROUND OF THE INVENTION

1. Field of the Invention

The present invention relates to a cooker with heating control system wherein its heater, such as a gas heater or electric heater, is automatically controlled with a high accuracy, thereby preventing boiling over of pan.

2. Description of the Prior Art

It is known that a stew cooking requires strong heating at the initial stage and, when the materials in the pan is about to boil the heating must be switched to a very low rate not to boil over, and such weak heating is continued for a long time. In order to proceed such cooking, person has been manually controlling the heater, and experiencing boiling over due to inadvertent forgetting of weakening the fire, and such manual handling is liable to waste of energy and difficult to carry out in ideal manner.

Figure 10A:
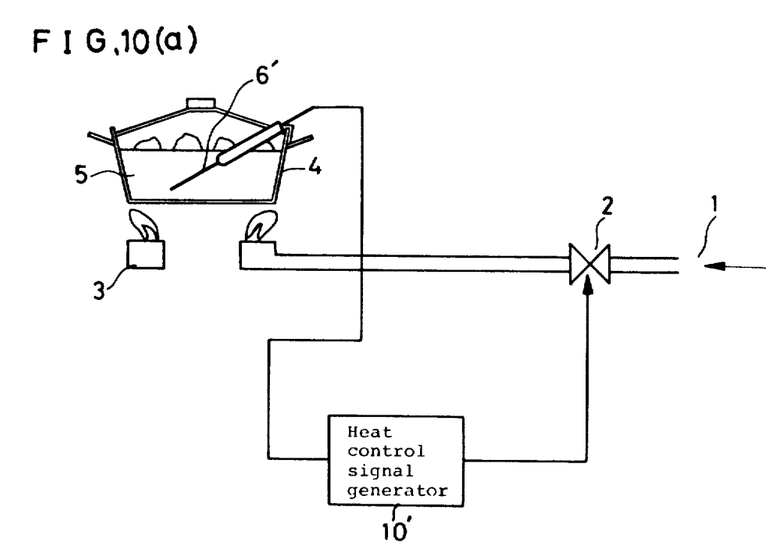
FIG. 10(a) and FIG. 10(b) are the schematic views of the exemplary conventional automatic temperature control gas-cooker.
Figure 10B:
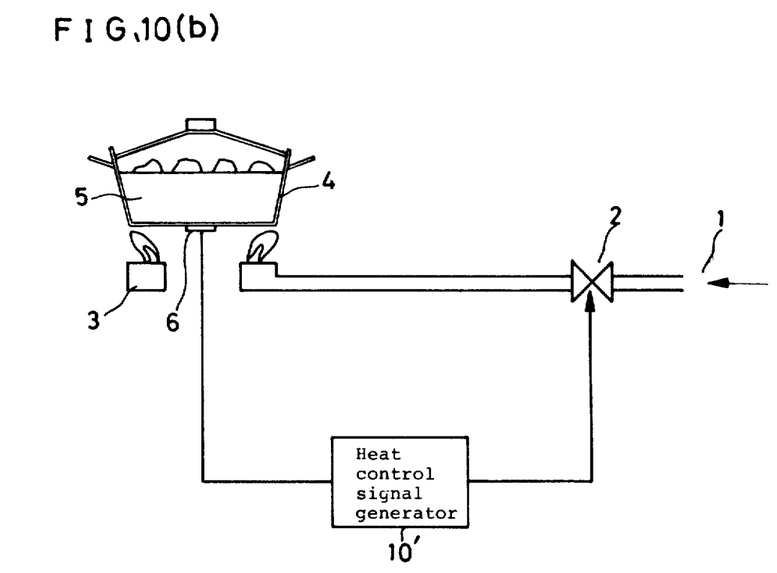

Hitherto, such a device as shown in FIG. 10(a) has been proposed that temperature of the food material 5 of a cooking pan 4 is measured by a sensor 6' and control circuit 10' issues a signal to control a valve 2 such as a proportional valve or a two step valve, thereby to control heat amount of the heater 3 basing on the temperature, which is measured by the sensor 6'. However, in the conventional device of FIG.10(a), the temperature sensor 6' is to be put in the cooking pan, and is not easy to use, and gives a feeling of insanitary or hazardous. Therefore, another device as shown in FIG.10(b) has been proposed to detect temperature at the bottom of a pan 4 by contacting a sensor 6 to the bottom of a pan 4; but this device has a problem that the detected temperature is different from the actual temperature of the contents and the trouble is that the difference varies depending on material, shape or size of the pan 4 and the amount of the food material 5.

SUMMARY OF THE INVENTION

The present invention purposes to provide an improved cooker suitable for use in stew cooking or the like, wherein heating is made stronger at initial stage and is switched to a weaker state in the subsequent stage.

In the cooker in accordance with the present invention, temperature of cooking container is measured sequentially at predetermined sampling time points, and temperature gradients of cooking container or pan are given at the sampling time points, and by comparing the temperature gradients with a reference value, a bending point of the temperature gradient, which corresponds to the boiling point is found. When the temperature gradient becomes lower than a predetermined level, the heating is switched to a lower heating.

Figure 2:
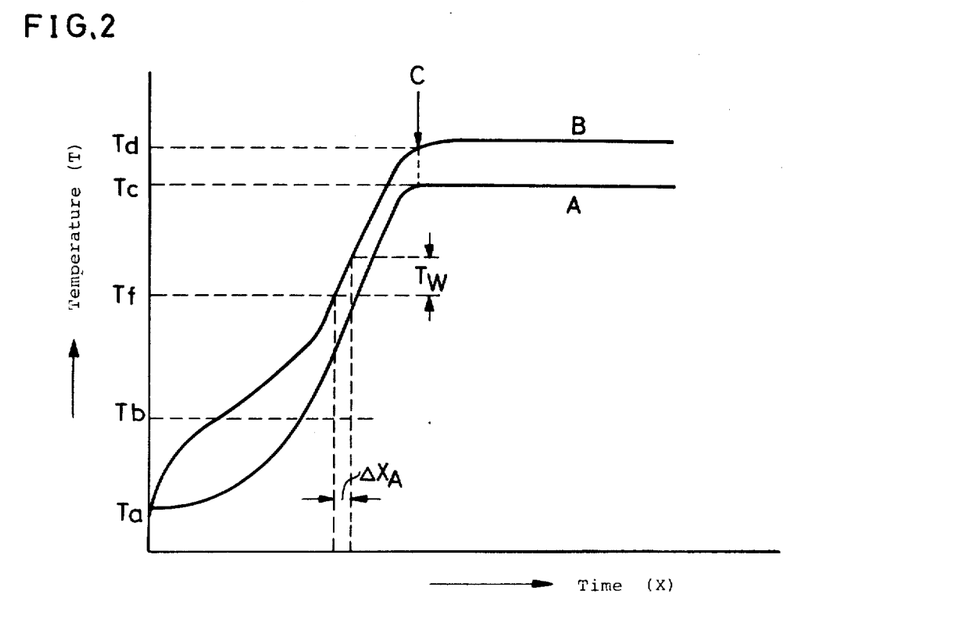
FIG. 2 is a time-temperature graph explaining principle and operation at initial stage of heating of the cooker in accordance with the present invention.

According to a modified mode of the present invention, the measured temperatures at sampling time points may be processed such that difference or ratio between two temperature differences (temperature rise rates) at neighboring two sampling time points are calculated, and the calculated value is compared with a predetermined reference value. The above-mentioned processing of measured data is carried out by means of a microcomputer, and bending point of temperature gradient is easily detected. The bending point is a point C on the curve B of FIG. 2 which is defined, as shown in FIG. 2, as the working point or the temperature measured by the temperature sensor 6 on the bottom part of the container or the pan 4 at the time point when the temperature of the contents or food material of the pan 4 saturates when the contents or food material begins to boil.

According to the present invention, the detected temperature at the bending point is stored as a set temperature, and control of the heating can be carried out thereafter in a manner to keep the temperature at the bending point, thereby undesirable burning or boiling over is prevented.

Furthermore, according to the present invention, by measuring the temperature gradient, the amount of contents in the pan can be calculated, and thereby the heating after reaching the bending point can be most appropriately controlled, or further the setting of the temperature to be retained after the bending point can be modified taking account of the above-mentioned calculated contents amount.

Still furthermore, according to the present invention, boiling point or bending point of the temperature gradient can be more accurately calculated by starting the producing of the temperature gradient output only after passing over unstable temperature region due to dew on the outer face of the pan or the container.

Still furthermore, according to the present invention, the boiling point or bending point of the temperature gradient can be more accurately found, by adjusting a reference value to be used in determining the bending point taking account of value of the temperature gradient, or by changing calculation program for finding the bending point taking account of the value of the temperature gradient, or by changing sampling time pitch taking account of the temperature gradient.

Furthermore, the detection accuracy is improved by limiting the calculation operation only above a predetermined temperature where the output of temperature sensor is reliable.

The sensor can be attached on the bottom face of any pan or cooking container to be heated on a heater, thereby making the usage simpler and more sanitary than the conventional ways.

In order to enable the above-mentioned functions, the cooker in accordance with the present invention is constructed as stated in the following embodiments and claims.

Cooker in accordance with the present invention comprises heater means for heating food material in a container, temperature measuring means for measuring temperature of the bottom of the container and issuing temperature signals, heat amount control means for controlling amount of heat issued from the heating means and a heat control circuit part for issuing a control signal to be given to the heat amount control means based on input temperature signals, the heat control circuit part comprising temperature gradient signal generator means for producing temperature gradient signal of the temperature signal input thereto, bending point detector means for detecting bending point of the temperature increase and issuing a detection signal and output signal means for outputting the control signal for the heat amount control means basing at least on output of the bending point detector.

DESCRIPTION OF THE PREFERRED EMBODIMENTS

The present invention is elucidated in detail referring to the accompanying FIGS. 1 to 9.

Figure 1:
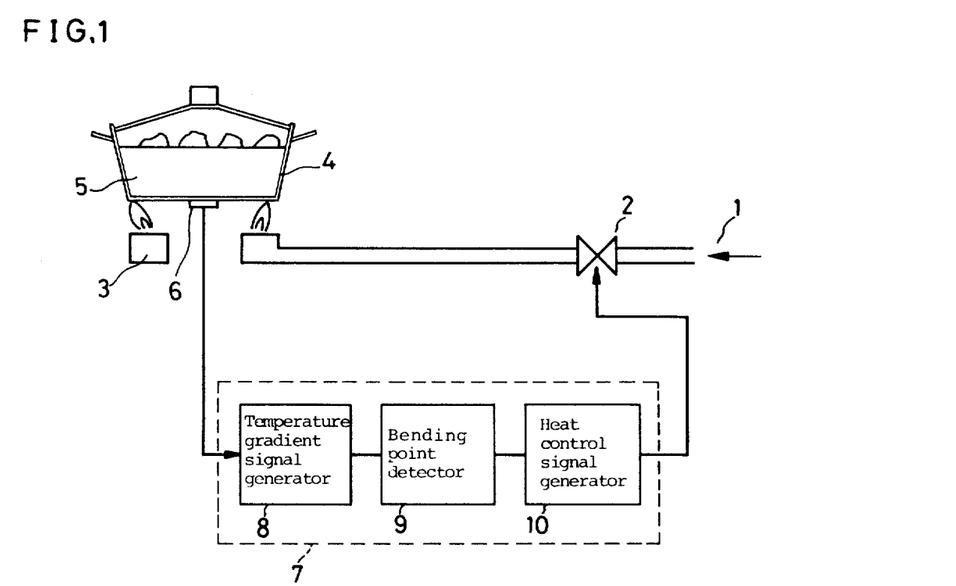
FIG. 1 is a schematic sectional view of a cooker in accordance with the present invention, together with block diagram of its heating control system.

FIG. 1 shows an example of a cooker using a gas heater and other related parts embodying the present invention.

A gas burner 3 or heater has a temperature sensor 6 to be applied to the bottom face of a pan 4 to be put thereon for cooking food material 5 therein. The gas burner 3 is fed with a city gas or LPG by a supply 1 and through a heat amount control means 2, such as continuously adjustable valve, proportional valve, or a large-small-off type three flow rate states valve. Output of the temperature sensor 6 is led into a temperature gradient signal generator 8 which generates signal of temperature gradient, which is then given to a bending point detector 9 for detection of a bending point of temperature increase. The output of the bending point detector detector 9 is then given to a heat control signal generator i.e. output signal means 10 which drives the heat amount control means 2 in a manner to appropriately control the heat amount suitable to keep a good stewing or cooking at a temperature, for instance, immediately below the boiling point of water. In the following embodiments, the temperature gradient has in many places substantially the same meaning as the temperature differences or temperature rises in sequential sampling times. Accordingly, in some embodiments, either words are used to include the other.

Now a more detailed explanation is given taking an example using a continuously adjustable valve as the heat amount control means 2. In general, when the burner 3 is burning, temperature of the bottom face of the pan 4 is not equal to that of the food material 5 in the pan. That is, the temperature measured at the bottom of the pan 4 is higher than that of the food 5 in the pan, and the difference between the two temperatures varies depending on many factors, and is not constant. On the other hand, in order to make a good stew cooking, after the food material 5 in the pan 4 reaches 100° C., the temperature of the food material 5 should be kept at 100° C. for a predetermined time, taking care not to allow the food material 5 to boil over the pan 4. If the heat amount control means 2 is controlled simply based on the temperature of 100° C. measured by the bottom face of the pan 4, then the food material 5 never reaches the temperature of 100° C. If the heat amount control means is controlled based on the temperature of several degree above 100° C. measured at the bottom of the pan 4, then, the heating of the food material 5 may be sometimes excessive, sometimes appropriate and sometimes insufficient, depending on the amount of food material, nature and size of pan 4, dew outside the pan, etc.

The cooker in accordance with the present invention utilizes temperature gradient change as input signal for control, basing on the fact that water contained in a cooking pan 4 never exceeds 100° C. (at normal atmospheric pressure), and the temperature measured at the bottom of the pan stop rising when the water in the pan becomes 100° C. or the boiling point, thereby the temperature gradient decreases when the water in the pan 4 reaches the boiling point.

FIG. 2 shows curves of relations between temperature T and time X of a cooker shown in FIG. 1, where curve A is for the temperature of water or food material 5 and curve B is for the temperature of the bottom of the pan 4, which is measured by the temperature sensor 6 on the bottom. Hereinafter, the temperature of the curve B is referred to simply as the temperature of the bottom of the pan 4. At first, when the burner 3 starts burning, the temperatures of the food material 5 and the bottom of the pan 4 rise from the room temperature Ta. The temperature risings become slow around a temperature Tb, and after a while the temperature risings speed up. This is because the dew outside the pan evaporates around the temperature Tb. This temperature Tb is around 40°–70° C. and varies depending on material and size of the pan or the container. Then, temperatures rise and when the temperature of the contents becomes Tc which is 100° C., the curve A saturates and then the curve B for the temperature of the bottom of the pan also nearly saturates at a temperature Td, which is a little higher than Tc. The temperature difference between Td and Tc varies depending on material and size of the pan or the container and amount and kind of food material in the pan or the container. However the fact that the point C which is the bending point of the curve B appears when the water starts boiling does not change.

Figure 3:
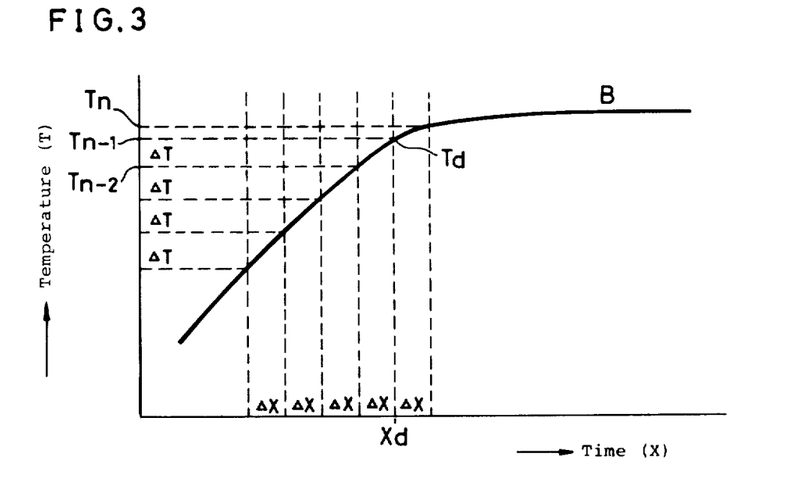
FIG. 3 is another time-temperature graph explaining principle and operation of temperature gradient of the cooker in accordance with the present invention.

FIG. 3 shows a method of detecting of the bending point. In this method, temperatures difference $\Delta T$ or temperature gradient $\Delta T/\Delta X$ are measured at every sampling time points with time pitch $\Delta X$ by the temperature gradient signal generator 8, and when $\Delta T = T_n - T_{(n-1)}$ becomes smaller than a predetermined reference value $V_r$ as:

$$\Delta T = T_n - T_{(n-1)} < V_r \tag{1}$$

it is judged that the bending point, where the water of the food material or contents of the pan becomes 100° C. (in case of normal atmospheric pressure).

Alternatively, the bending point can be found by detecting that a ratio of a temperature difference $\Delta T$ to the foregoing temperature difference decreases below a predetermined reference value. That is, the bending point can be found as the operation point when a ratio $R_m$ of the measured temperature differences $$R_m = (T_n - T_{(n-1)})/(T_{(n-1)} - T_{(n-2)})$$

becomes smaller than a predetermined reference value $R_f$ as follows:

$$R_m = (T_n - T_{(n-1)})/(T_{(n-1)} - T_{(n-2)}) \leq R_f \qquad (2)$$

The formula for judging the ratio's becoming smaller than a predetermined value can be otherwise, as far as a ratio of gradient is judged. These judgings are made by the bending point detector 9 which receives the output of the temperature gradient signal generator 8.

The result of the judging for finding the bending point can be used in various controlling. For example, the signal of detection of the bending point can be used to close the valve 2 thereby to stop burning of the burner 3. This may be appropriate for use in a purpose of boiling of water. Another usage is to use the signal of the detection of the bending point in switching the valve 2 via the heat control signal generator 10, so as to switch and continue the burning of the burner in a smaller calory. In ordinary cooking, especially in stew cooking, this latter type usage is common for continuation of long time cooking with a small calory heating thereby to keep the contents 5 of the pan 4 about the boiling point of the water without boiling over.

Figures 4A, 4B:
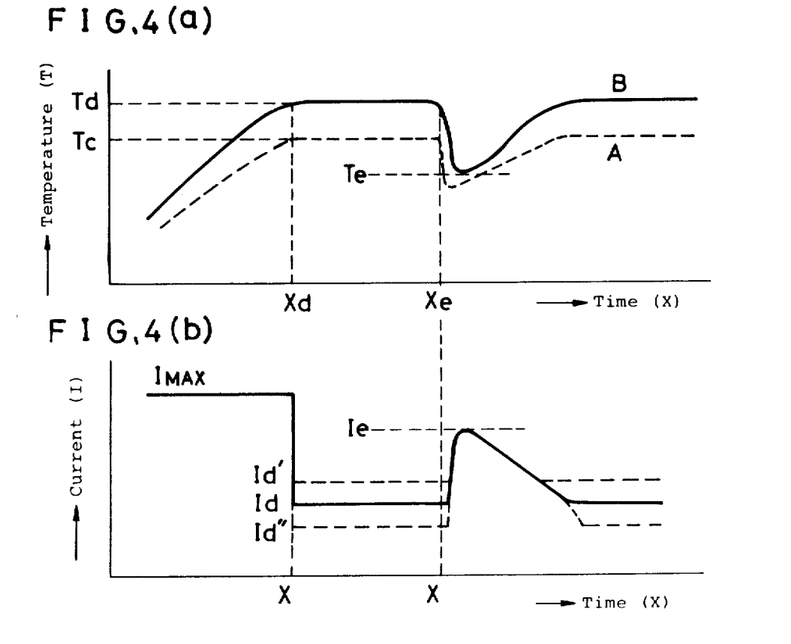
FIG. 4(a) is another time-temperature graph explaining principle and operation of proportional control of the cooker in accordance with the present invention.
FIG. 4(b) is a time-current graph of the operation of the cooker of FIG. 4(a).

FIG. 4(a) and FIG. 4(b) elucidate the abovementioned stew-type cooking, wherein the abscissas are graduated with time X and the ordinate of FIG. 4(a) is graduated with temperature T and the ordinate of FIG. 4(b) is graduated with control current I to control a proportional valve 2, which is proportional to the flow rate of gas to, hence burning calory of the burner 3. A period from a igniting of the burner 3 till the time point Xd is the period before issuance of the saturation detection signal from the bending point detector 9, when the current I to the proportional valve 2 is maximum, and accordingly the burner calory is maximum. At the time Xd, the temperature of the contents is at boiling point. And when the temperature measured by the sensor 6 attached at the bottom of the pan 4 nearly saturates then the bending point detector 9 issues signal to the heat control signal generator 10, which decreases its output current I to a value Id and makes the valve 2 to switch the burning calory down. The heat control signal generator 10 memorizes therein the measured maximum temperature Td which is corresponding to the boiling point temperature as the reference temperature, and controls the valve 2 in a proportional controlling way responding to instantaneous temperature differences which are the differences between the instantaneous measured temperature and the reference temperature Td. Provided that, the contents 5 in the pan 4 is added at the time Xe, then the temperature A of the contents is lowered, and resultantly the temperature B of the sensor 6 is lowered too, thereby lowering the measured temperature given to the circuit 7. The heat control signal generator 10 changes its output from Id to Ie responding to the temperature difference between the memorized reference temperature for the boiling point and the instantaneous input temperature. Thereby the burning calory increases. And after a certain time the temperature of the contents 5 in the pan 4 gradually increases and restores to the boiling temperature, and then the measured temperature becomes high, thereby the heat control signal generator 10 gradually lowers its output current I as shown in FIG. 4(b), and at the detection of the saturation point of the measured temperature, the output current I is decreased again to the value of Id. In the above-mentioned proportional controlling, the larger the temperature difference Td—Te which is between the measured maximum temperature Td and the measured instantaneous temperature Te becomes, the larger the control current Ie—Id is selected, and vise versa.

It is advantageous that the bending point generator 9 is constructed not to issue false or suprious saturation point signal at the dew evaporation point Tb shown in FIG. 2. This is done by inhibiting the issue of output signal when the measured temperature is lower than a predetermined limit temperature Tf. By such construction, erroneous operation of issuing a bending point detection signal due to decrease of temperature gradient by the dew evaporation is avoided.

It is advantageous for good stew-type cooking to design the circuit in such a manner that heating amount for keeping the contents at boiling state after reaching the bending point is controlled based on the temperature gradient before the reaching of the bending point. When the temperature gradient is dull, then this means that the amount of the contents 5 is large or heat capacity of pan 4 is large. For such case, it is necessary to select the supply amount of the control current for retaining the boiling state to be a larger value Id' than the standard case shown by the current Id of FIG. 4(b). On the contrary, when the temperature gradient is larger then the standard case, the amount of the control current used for retaining the boiliig state should be smaller as Id" of FIG. 4(b).

Figure 5:
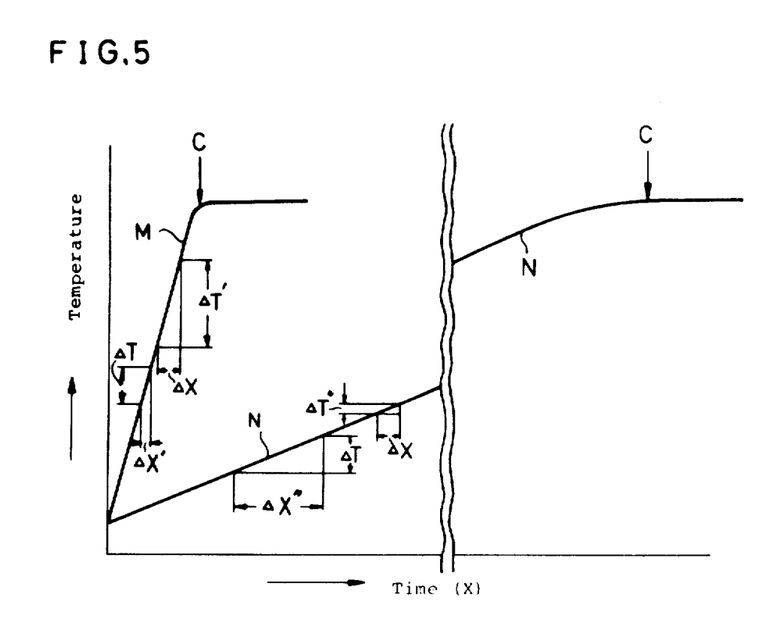
FIG. 5 is another time-temperature graph explaining difference of initial heating period depending on amount of material to be cooked in the cooker of the present invention.

FIG. 5 shows manner of difference of time-temperature characteristic of the apparatus depending on amount of contents i.e. food material. For instance, when the amount of contents 5 is small, the operation point moves along a curve M which has a steeper temperature gradient, and its bending point appears relatively clear, thereafter curve becomes substantially horizontal. On the other hand, when the contents is large, the operation points moves along another curve N, and its bending point appears relatively unclear, gradually turning to substantially flat part. Therefore, it is not satisfactory to detect the bending point simply by comparing the temperature gradients or ratio of sequentially sampled temperature gradient with a reference value.

Accordingly, it is advantageous to take the following judging manner that after passing the temperature Tf of FIG. 2 the temperature rising $T_W$ are measured at every sampling time points sampled with time pitch $\Delta X_A$, and the reference value $V_r$ or $R_r$ to be used for judgement of reaching the saturation point (boiling point) is adjusted responding to the value of temperature rising $T_W$. Therefore, a reference value P for such purpose is given as follows:

$$P = K \cdot T_W + L \qquad (3),$$

wherein K and L are constants obtainable by experimental process.

In case the temperature gradient varies largely as the curves M and N of FIG. 5, when the same sampling time pitches ΔX are used for both cases of the steep curve M and dull curve N, then the temperature difference signal T much differs, namely large for the steep curve M and small for the dull curve N. Accordingly, when the curve is dull, accurate detection by comparison with the reference value $R_f$ is difficult; and when the curve is steep, before detecting the bending point a considerable time may lapse thereby causing boiling over before the switching low of the heating. Therefore, in order to eliminate the above-mentioned inconvenience, it is advantageous to adjust the sampling time pitch ΔX responding to the amount of the measured temperature difference value $T_W$. That is, the value $T_W$ is compared with reference value(s) $T_{Wo}$ and (i) for a steep curve M, that is, when the measured $T_W$ is larger than the reference value $T_{Wo}$, then the sampling time pitch is switched to a smaller value ΔX', and the detection of the bending point is made by an inequity:

$$\Delta T' \leq K' \cdot T_W + L' \quad (4),$$

where K' and L' are constants, and ΔT' is temperature rise for the smaller sampling time pitch ΔX', (ii) for a dull curve N, that is, when the measured $T_W$ is smaller than the reference value $T_{Wo}$, then the sampling time pitch is switched to a larger value ΔX", and the detection of the bending point is made by an inequity:

$$\Delta T'' \leq K'' \cdot T_W + L'' \quad (5),$$

where K" and L" are constants, and ΔT" is temperature rise for the larger sampling time pitch ΔX".

If the difference of the gradient of the curve differs very much, then it is preferable to use two or more reference values $T_{Wo}$, for instans $T_{Wo1}$ and $T_{Wo2}$, so that the detection of bending point is made by using three inequities similar to those of (4) and (5). The more the number of the reference values $T_{Wj}$ are, the more accurate the controlling becomes.

A further modified example is that the sampling time pitch ΔX as such is given as a function with $T_W$ as variable given as follows:

$$\Delta X = f(T_W) \quad (6),$$

so that an ideal value of the sampling time pitch ΔX is always obtainable for any gradient of the time-temperature curve, and thereby a good accuracy is obtainable.

In order to avoid erroneous operation due to addition of food material or contents 5 of the pan 4 or stirring of the contents, it is advantageous to start data processings of $T_W$ for determining the sampling time pitch ΔX from a suitable temperature, which is preferably higher than $T_f$, that is relatively close to the boiling point. It is also preferable to provide warning means such as buzzer for inhibiting addition or taking out of contents during the gradient measurement process.

The above-mentioned measurement of $T_W$ is usable also for detecting the nature of pan 4 or container. That is, the operation curve moves by the influence of the heat capacity of the pan 4, and the curve is also influenced by the dewing on the outside of the pan 4. Therefore, the kind and state of the pan 4 is detected by the curve. Furthermore, by making the measurements of $T_W$ for plural times at different temperatures of the pan 4, adjustments of heating programs can be made for kind and state of the pan 4 and amount of contents thereof, thereby assuring more accurate controls.

Figure 6:
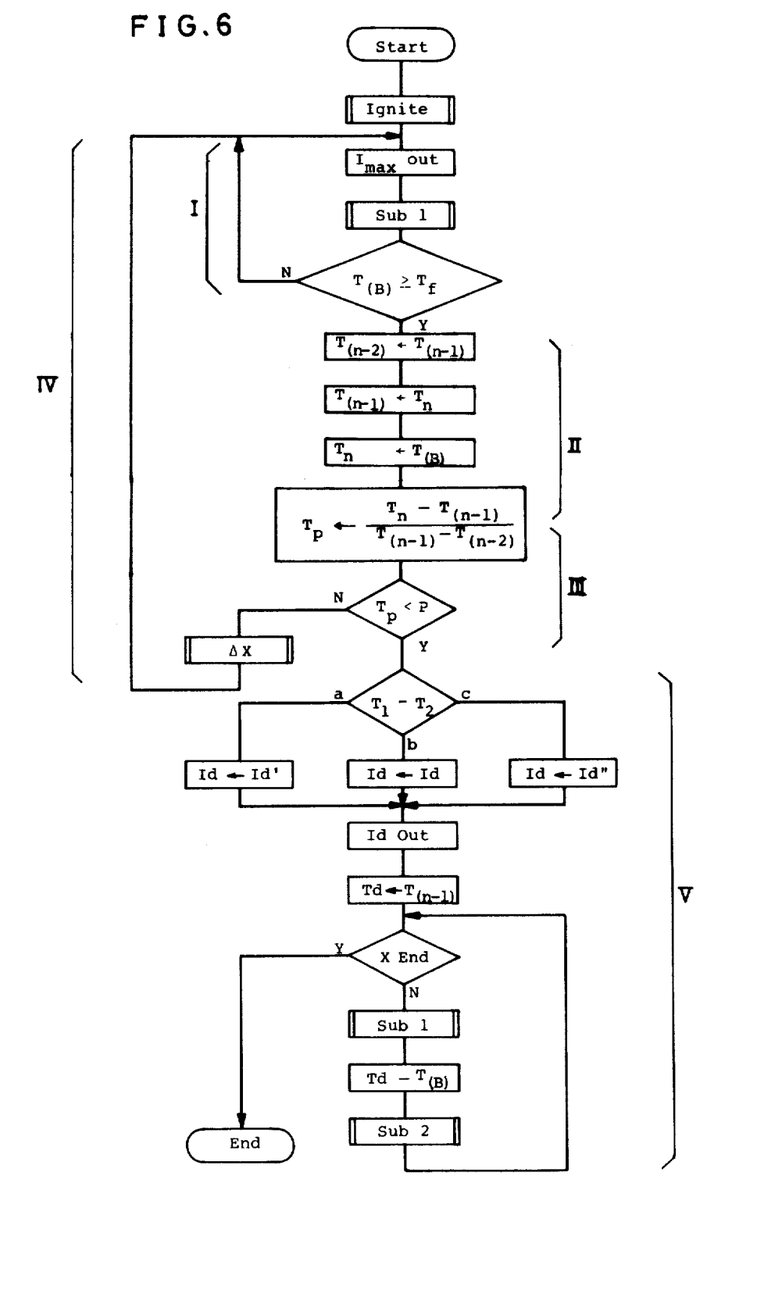
FIG. 6 is a flow chart showing an example of temperature control operation.

The above-mentioned complicated control system is realized by utilizing a microcomputer. FIG. 6 shows a flow chart of such microcomputer for realizing the above-mentioned operations elucidated referring to FIGS. 1 to 4.

In FIG. 6, a block "Ignite" designates a subroutine of an igniting sequence, a block "Sub 1" designates a subroutine of reading-in a temperature $T_{(B)}$ of the sensor 6, and a block "Sub 2" designates a subroutine for determining valve opening of the control valve 2 and outputting a current I for controlling the valve, responding the temperature difference $Td - T_{(B)}$ between the target temperature Td and the sensor temperature $T_{(B)}$.

In case, in a relatively early stage after the ignition, the sensor temperature $T_{(B)}$ is lower than the detection start temperature $T_f$ of FIG. 2, then the step returns, through the loop I of FIG. 6, to the step $I_{max}$ out, and repeat the same until $T_{(B)} > T_f$ is realized.

When the condition $T_{(B)} > T_f$ becomes fulfilled, then the operation proceeds to the steps of II for measuring gradient as elucidated with reference to FIG. 3.

The steps of III of FIG. 6 is for detecting the saturation point, and the temperature $T_p$ as defined $$T_p = \frac{T_n - T_{(n-1)}}{T_{(n-1)} - T_{(n-2)}} \quad (7)$$

is compared with a reference value P in the step III, Then, when condition becomes $T_p < P$, measurings of sampling time pitch ΔX is commenced, and the procedure advances to the steps IV.

After $T_p \leq P$ is attained and the bending point is attained, then the operation point advances to the process of V, which is the course of proportional controlling. A block labeled as "X End" designates a program to stop the system upon completion of the predetermined cooking time.

Instead of the above-mentioned example where the value $T_p$ is obtained as a ratio as defined in the equation (7), another method can be adopted such that $T_p$ is defined by the following equation:

$$T_p = T_n - T_{(n-1)} \quad (8).$$

Any other $T_p$ may be used if it will give the bending point.

In the first step of the process V, shown by a rhombus block designated as $T_1 - T_2$ functions the following selection for the proportional controlling:

(i) when $T_1 - T_2 \geq \alpha$ . . . select output "a",
(ii) when $\alpha < T_1 - T_2 < \beta$ . . . select output "b",
(iii) when $\beta < T_1 - T_2$ . . . select output "c", where $T_1$ . . . is a temperature measured, first time after of the measurement, that is the temperature after T exceeded $T_f$, and T . . . is a second temperature measured, that is made next to the measurement of $T_1$, α and β . . . predetermined temperature differences selected as $\alpha < \beta$.

The control of the gas burner is such that, when output "a" is selected, the large control current Id' is selected, when output "b" is selected, the intermediate control current Id is selected and when the output "c" is selected the smallest control current Id' is selected, thereby attaining quasi-proportional controlling.

It is of course preferable to adopt a more precise proportional controlling by adopting variation of the control current Id continuously responding to variation of the $T_1-T_2$, such as given by a function:

$$Id = f(T_1 - T_2) \qquad (9)$$

Instead of setting the temperature Td at the temperature $T_{n-1}$, as shown in FIG. 3, other Td can be modified or adjusted by the difference $T_1-T_2$, or selection of the adjusting may be used.

Instead of using the above-mentioned fixed target value P, the target P may be preferably made as a function of a variant $T_1-T_2$, or selected responding to the variant $T_1-T_2$.

The sampling time pitch $\Delta X$ is preferably adjusted responding to the value of $T_1-T_2$ in order to obtain an accurate controlling.

Figure 7:
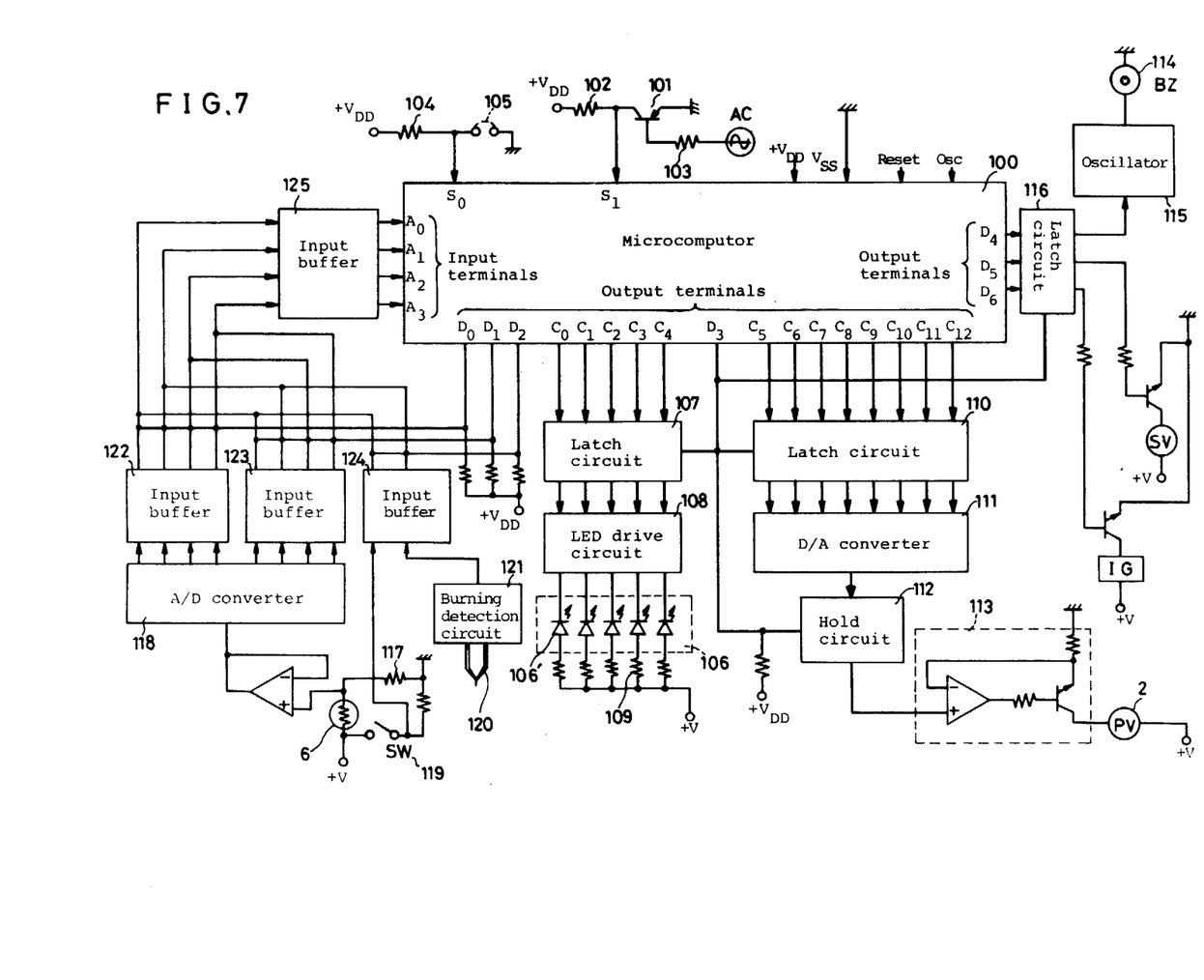
FIG. 7 is a detailed circuit block diagram of a case where the temperature control part is constituted with a microcomputer.

FIG. 7 shows a circuit diagram of an actual construction of the apparatus, wherein calculations for the temperature control is made by a microcomputer 100. A stored program general purpose LSI microcomputer is used as the microcomputer 100. The microcomputer has input terminals $S_0$, $S_1$, $A_0$, $A_1$, $A_2$ and $A_3$, output terminals $C_0$, $C_1$, $C_2$, $C_3$, $C_4$, $C_5$, $C_6$, $C_7$, $C_8$, $C_9$, $C_{10}$, $C_{11}$, $C_{12}$, $D_0$, $D_1$, $D_2$, $D_3$, $D_4$, $D_5$ and $D_6$, power source connection terminals $V_{DD}$ and $V_{SS}$, clock signal terminal Osc and initializing terminal RESET. Commercial AC power frequency signal is input from the input terminal $S_1$ after waveforming by circuit of a transistor 101 and resistors 102 and 103. The microcomputer 100 counts the commercial power frequency signal as reference time pulse for its timer. Terminal $S_0$ is for adjusting for difference of the commercial power frequency by districts, and select necessary operation sequence by change of logic level at the terminal $S_0$ through connection and disconnection of the jumping wire 105.

The output terminals $C_0$, $C_1$, $C_2$, $C_3$ and $C_4$ are for driving displaying diode unit 106 for cook temperature or cook time length, and displays necessary contents by LEDs 106' by using the latch circuit 107 and LED drive circuit 108. A resistor 109 is a current limiter for the LEDs 106'. The output terminals $C_5$, $C_6$, $C_7$, $C_8$, $C_9$, $C_{10}$, $C_{11}$ and $C_{12}$ are for outputting driving signals for proportional control valve 2, and burning control in $2^8=256$ stages are obtainable by the output therefrom. The signals are led through a latch circuit 110, D/A converter 111 and holding circuit 112, and are given to the amplifier 113 which feeds current to the valve 2.

The output terminal $D_4$ is outputting signal to drive a buzzer 114 for reporting, for instance, a completion of a cooking, and an oscillator 115 is driven by this output to and drives the buzzer 114. Instead of the oscillator 115, clock signal of the microcomputer 100 may be used.

The output terminal $D_5$ is for driving an electromagnet valve (not shown in FIG. 1) for stop of burning, and the output terminal $D_6$ is for actuating a burner ignitor (not shown in FIG. 1). The outputs data of the output terminals are latched by a latch circuit 116. Latch circuits 107, 110, 116 and the hold circuit 112 are reset of their data by resetting signal from the output terminal $D_3$.

The input terminals $A_0$, $A_1$, $A_2$ and $A_3$ are for taking 4 bit data into the microcomputer 100. Temperature measuring signal, from the temperature sensor 6, burning detection signal and valve state detection signals are input to these input terminals $A_0$ to $A_3$. In the table type gas burner the temperature range to be detected is selected between 50°-150° C., which has a temperature range of 100° C. In order to measure the temperature within 0.5° C. resolution for the 100° C. temperature range, 200 steps are necessary, and therefore, 8 bit data must be input in the microcomputer 100. Therefore, the voltage of the temperature sensor 6 is input to the A/D converter 118 so as to be converted into 8 bit digital signal, and the data are divided into an upper 4 bit and lower 4 bit which are input to input buffer circuits 122 and 123, respectively. Furthermore, signal of a cook switch 119 and output signal of a burning detection circuit 121 which outputs output of a burning detection thermocouple 120, are similarly input through an input buffer circuits 124 and 125 to the input terminals $A_0$, $A_1$, $A_2$ and $A_3$.

Furthermore, a preset temperature of the temperature sensor 6 may be input when necessary. If the microcomputer 100 has more input port than those of $A_0$ to $A_3$, then there is no way of splitting the data into two sets of 4 bit data.

Figure 8:
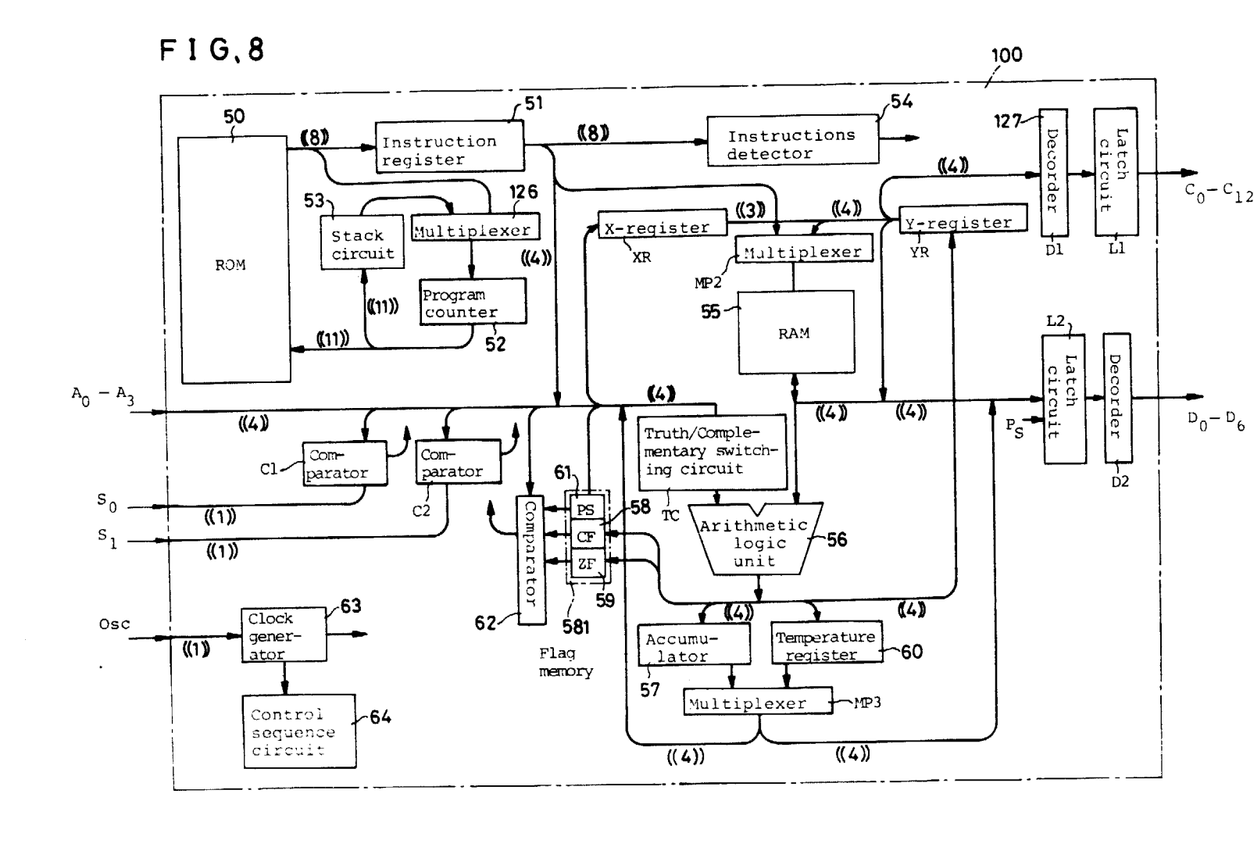
FIG. 8 is a chart showing architecture of the microcomputer 100 of the example of FIG. 7.

FIG. 8 shows an example of architecture diagram of the microcomputer 100, and is elucidated hereafter:

A ROM 50 designates a fixed memory wherein settings, displayings and operations controls are programmed and stored therein in the type of instruction code. The microcomputer 100 can store 8 bit instruction code of at largest 2048 steps. An instruction register 51 temporarily stores instruction code issued from the ROM 50. A program counter 52 is for designating and refreshing address of the instruction code in ROM 50, and 11 bit are necessary therefor in order to designate addresses of 2048 ($=2^{11}$) steps at most. A stack 53 is a register to retain return address when subroutine is controlled. Multiplexer 126 is for selection of address stored in the stack and designated address at execution of branch instruction. Instruction decoder 54 is for decoding the instruction of the instruction decoder 51.

RAM 55 is a data memory capable of write-in and read-out at 4 bit unit, and has a memory capacity of 4 bit$\times$128 steps. The addressing of the 128 steps can be made by 7 bits. For address register to the RAM 55, 3 bit X-register XR and 4 bit Y register YR are provided. The contents of the Y register YR is decoded by a decoder 127 for individual designation of the output terminals $C_0$ to $C_{12}$.

Arithmetic logic unit 56 is for execution of operations and determinations. Arithmetic logic unit 56 receives by means of instructions thereto a pair of 4 bit data, and the result of the execution is, depending on necessity, stored in an accumulator 57, carry flag memory 58, zero flag memory 59, Y register YR or RAM 55. A flag memory 581 includes the carry flag memory 58, which is set by a carry from the highest bit issued at an operation in ALU 56, the zero flag memory 59, which is set when the result of operation in ALU 56 is zero, and a program status memory 61, which is a 1 bit memory and is set or reset by instruction. A temporary register 60 is a 4 bit register for temporary storing. The outputs of the program status memory 61, the carry flag memory 58 and the zero flag memory 59 are led through a comparator 62 to a control sequential circuit 64, which control internal operation sequence of the microcomputer 100. Clock generator 63 issues clock signal of the microcomputer.

In FIG. 8 numerals which are in double brackets and are put on signal lines designate bit number of the signal lines.

The microcomputer 100 of the architecture shown in FIG. 8 operates being controlled by instruction codes stored in ROM 50 of itself, and controls various devices and stores and read out heating pattern of automatic cooking.

Control sequence of the temperature control circuit 7 of FIG. 1 is stored in the ROM 50, and temperature gradient value obtained in the temperature gradient signal generator 8 is stored in RAM 55 and is refreshed depending on necessity.

Instead of the above-mentioned gas burner, the control of the heating can be applicable to electric heater, petroleum heater, oven heater or any type of heating means; and the control may be, besides the above-mentioned proportional control, high-low control or on-off control.

Figure 9:
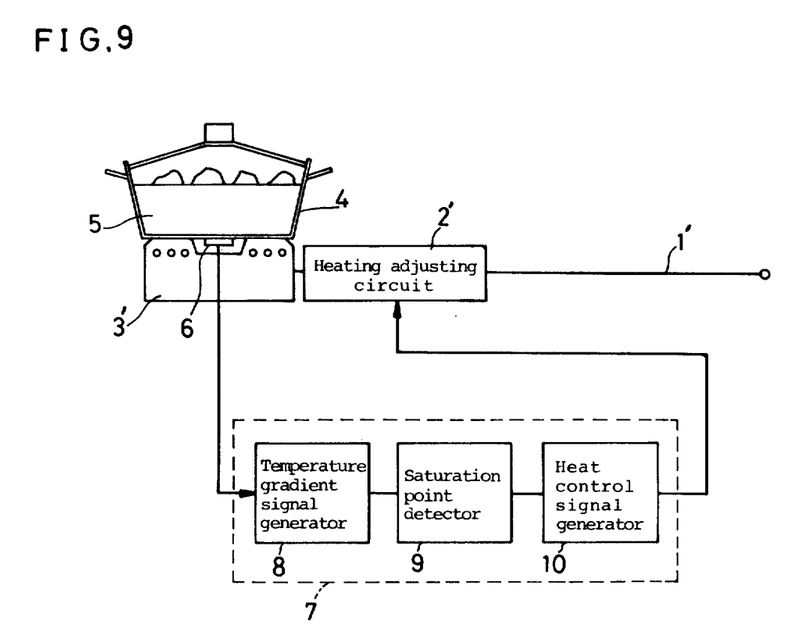
FIG. 9 is a schematic sectional view of a cooker of another embodiment in accordance with the present invention together with block diagram of its heating control system.

In applying the present invention to an electric heating, the apparatus is constructed as in FIG. 9, wherein, instead of the proportional valve of FIG. 1, a heating adjusting circuit 2' is used for a proportional heating adjustment of electric supply from commercial power line 1' to an electric heater 3'. A preferable construction of the heating adjusting circuit 2' is a continuous adjusting of heater current by means of firing angle of thyristor. The continuous adjustment of the electric heating current is advantageous in that any small heating power is obtainable, thereby enabling delicate cooking. A simplified modified mode may be using of on-off relay to control means value of current for a certain time period instead of proportional adjusting of current by the thyristor.

The apparatuses embodying the present invention is very useful in practical usage in combining the temperature sensor 6 applied to the bottom of any type of pan 4 of any material with temperature gradient signal generator 8 and a bending point detector 9. As a result of the above-mentioned construction, even when the heat capacity of a pan 4, existing of dew on the bottom of the pan 4 and contents of food material 5 in the pan etc. vary, the apparatus automatically find the time and amount of adjusting the heating to enable ideal cooking without fear of boiling over or burning of food, and thereby energy of cooking is saved.

What is claimed is:

1. A cooker comprising:
   heating means for heating food material in a container,
   temperature measuring means for measuring temperature of outer face of the container, and issuing temperature signals,
   heat amount control means for controlling amount of heat issued from the heating means and
   a heat control circuit part for issuing a control signal to be given to the heat amount control means based on said temperature signals input thereto,
   said heat control circuit part comprising temperature gradient signal generator means for producing signal of temperature gradient from the input temperature signal, bending point detector means for detecting bending point of the temperature increase and issuing a detection signal and heat control signal generator for outputting the control signal for the heat amount control means basing at least on output of the bending point detector.

2. A cooker in accordance with claim 1, wherein said temperature gradient signal generator is constructed to sample said temperature signals with sampling time pitch to produce temperature differences between temperatures at neighboring sampling times, and
   said bending point detector is constructed to detect a time when ratio between neighboring ones of said temperature gradient exceeds a reference range.

3. A cooker in accordance with claim 1, wherein said temperature gradient signal generator is constructed to sample said temperature signals with sampling time pitch to produce temperature differences between temperatures at neighboring sampling times, and
   said bending point detector is constructed to detect a time when difference between neighboring ones of said temperature gradient exceeds a reference range.

4. A cooker in accordance with claim 1, wherein, in said heat control circuit,
   a measured temperature of said temperature measuring means at the time of bending point detection is set as a set temperature,
   and amount of heating thereafter is controlled responding to temperature differences between measured temperatures and said set temperature.

5. A cooker in accordance with claim 2, wherein, in said heat control circuit,
   a measured temperature of said temperature measuring means at the time of bending point detection is set as a set temperature,
   and amount of heating thereafter is controlled responding to temperature differences between measured temperatures and said set temperature.

6. A cooker in accordance with claim 3, wherein said temperature gradient signal generator is constructed to sample said temperature signals with sampling time pitch to produce temperature differences between temperatures at neighboring sampling times, and
   said bending point detector is constructed to detect a time when difference between neighboring ones of said temperature differences exceed a reference range.

7. A cooker in accordance with claim 4, wherein said heat control circuit controls amount of heating responding to said temperature gradient at an initial heating stage.

8. A cooker in accordance with claim 5, wherein said heat control circuit controls amount of heating responding to said temperature gradient at an initial heating stage.

9. A cooker in accordance with claim 6, wherein said heat control circuit controls amount of heating responding to said temperature gradient at an initial heating stage.

10. A cooker in accordance with claim 4, wherein said heat control circuit adjusts said set temperature responding to temperature gradient at an initial heating stage.

11. A cooker in accordance with claim 5, wherein said heat control circuit adjusts said set temperature responding to temperature gradient at an initial heating stage.

12. A cooker in accordance with claim 6, wherein said heat control circuit adjusts said set temperature responding to temperature gradient at an initial heating stage.

13. A cooker in accordance with claim 1, wherein said temperature gradient signal generator means issues said temperature gradient signal to said bending point detect means only after reaching of the measured temperature to a predetermined temperature.

14. A cooker in accordance with claim 1, wherein a reference value for use in deciding said bendingpoint is adjusted responding to temperature gradient at an initial heating stage.

15. A cooker in accordance with claim 2, wherein said reference value to be compared with said ratio is adjusted responding to temperature gradient at an initial heating stage.

16. A cooker in accordance with claim 3, wherein said reference value to be compared with said difference is adjusted responding to temperature gradient at an initial heating stage.

17. A cooker in accordance with claim 1, wherein a reference value used for deciding said bending point is adjusted by selected one of a predetermined number of functions each having said temperature gradient as variant, said selection being made responding to said temperature gradient at an initial heating stage.

18. A cooker in accordance with claim 16, wherein said bending point detection means decides bending point by comparison between a reference value and a temperature gradient which is obtained by sampling at a sampling time pitch, said sampling pitch being adjusted responding to said temperature gradient.

19. A cooker in accordance with claim 17, wherein said bending point detection means decide bending point by comparison between a reference value and a temperature gradient which is obtained by sampling at a sampling time pitch, said sampling pitch being adjusted responding to said temperature gradient.

20. A cooker in accordance with either one of claims 7, 8, 9, 10, 11, 12, 14, 15, 16 and 17, wherein said initial temperature gradient is a temperature gradient immediately after detection of a measurement of starting temperature.

21. A cooker in accordance with claim 1, wherein said temperature sensor measures a temperature of outer face at substantial bottom part of said container.

* * * * *